US007269888B2

United States Patent
Neet

(10) Patent No.: US 7,269,888 B2
(45) Date of Patent: Sep. 18, 2007

(54) METHOD OF MAKING CASCADED MULTILAYER STATOR WINDING WITH INTERLEAVED TRANSITIONS

(75) Inventor: Kirk E. Neet, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 457 days.

(21) Appl. No.: 10/915,604

(22) Filed: Aug. 10, 2004

(65) Prior Publication Data

US 2006/0032040 A1   Feb. 16, 2006

(51) Int. Cl.
  *H02K 15/00* (2006.01)
  *H02K 15/14* (2006.01)
  *H02K 15/16* (2006.01)

(52) U.S. Cl. .......................... 29/596; 29/598; 29/605; 310/208; 310/201

(58) Field of Classification Search .......... 29/596–598, 29/732–735, 605, 606; 310/184, 201, 207, 310/218, 259
See application file for complete search history.

(56) References Cited

U.S. PATENT DOCUMENTS

| 2,781,465 | A | 2/1957 | Schuff |
| 3,122,667 | A | 2/1964 | Baciu |
| 3,444,407 | A | 5/1969 | Yates |
| 3,566,171 | A | 2/1971 | Tichy et al. |
| 3,634,708 | A | 1/1972 | Fisher et al. |
| 3,660,705 | A | 5/1972 | Willyoung |
| 3,753,060 | A | 8/1973 | Greenwell |
| 3,753,062 | A | 8/1973 | Greenwell |
| 3,780,324 | A | 12/1973 | Greenwell |
| 3,821,846 | A | 7/1974 | Pleiss, Jr. et al. |
| 3,838,322 | A | 9/1974 | Greenwell |
| 3,854,077 | A | 12/1974 | Greenwell |
| 3,884,385 | A | 5/1975 | Schaefer |
| 3,990,029 | A | 11/1976 | Kano et al. |
| 4,115,915 | A | 9/1978 | Godfrey |
| 4,176,444 | A | 12/1979 | Walker |
| 4,197,475 | A | 4/1980 | Ban et al. |
| 4,206,621 | A | 6/1980 | Kawasaki et al. |

(Continued)

FOREIGN PATENT DOCUMENTS

EP   1 134 872   9/2001

(Continued)

*Primary Examiner*—Minh Trinh
(74) *Attorney, Agent, or Firm*—Brinks Hofer Gilson & Lione

(57) ABSTRACT

A method for making a stator assembly includes forming several continuous conductors with generally-coplanar parallel-spaced straight segments interconnected by end loop segments, as by winding each of several conductors on a peg board, and then pressing the conductors to form either one, two, or three generally-orthogonal "jogs" in a given end loop segment. The conductors are interpositioned with their straight segments staggered and with a first leg of each subsequent conductor's end loop segments generally overlying a second leg of the immediately-prior conductor's end loop segments, except for the two end loop segments following the first conductor's "nth" straight segment, and multiples thereof, where the stacking order is reversed ("n" being equal to the number of stator core slots divided by the number of conductors that will form a given winding layer). The resulting preform is inserted into the core slots over multiple revolutions to thereby obtain a multilayer cascaded stator winding with interleaved transitions.

11 Claims, 9 Drawing Sheets

U.S. PATENT DOCUMENTS

| | | | |
|---|---|---|---|
| 4,451,749 A | 5/1984 | Kanayama et al. | |
| 4,617,725 A | 10/1986 | Holter et al. | |
| 4,757,601 A | 7/1988 | Leech et al. | |
| 4,808,868 A | 2/1989 | Roberts | |
| 4,829,206 A | 5/1989 | Honshima et al. | |
| 4,896,063 A | 1/1990 | Roberts | |
| 4,959,573 A | 9/1990 | Roberts | |
| 5,197,180 A * | 3/1993 | Mihalko | 29/596 |
| 5,231,324 A | 7/1993 | Kawamura et al. | |
| 5,343,105 A | 8/1994 | Sakabe et al. | |
| 5,444,321 A | 8/1995 | Honda et al. | |
| 5,449,962 A | 9/1995 | Shichijyo et al. | |
| 5,519,266 A | 5/1996 | Chitayat | |
| 5,539,265 A | 7/1996 | Harris et al. | |
| 5,708,316 A | 1/1998 | Ishida | |
| 5,714,824 A | 2/1998 | Couture et al. | |
| 5,864,193 A | 1/1999 | Katoh | |
| 5,936,326 A | 8/1999 | Umeda et al. | |
| 5,955,804 A | 9/1999 | Kusase et al. | |
| 5,955,810 A | 9/1999 | Umeda et al. | |
| 5,962,943 A | 10/1999 | Shervington | |
| 5,965,965 A | 10/1999 | Umeda et al. | |
| 5,986,375 A | 11/1999 | Umeda et al. | |
| 5,994,802 A | 11/1999 | Shichijyo et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,037,695 A | 3/2000 | Kanazawa et al. | |
| 6,049,154 A | 4/2000 | Asao et al. | |
| 6,051,906 A | 4/2000 | Umeda et al. | |
| 6,059,969 A | 5/2000 | Mizutani | |
| 6,078,116 A | 6/2000 | Shiga et al. | |
| 6,091,169 A | 7/2000 | Umeda et al. | |
| 6,097,130 A | 8/2000 | Umeda et al. | |
| 6,124,660 A | 9/2000 | Umeda et al. | |
| 6,137,201 A | 10/2000 | Umeda et al. | |
| 6,137,202 A | 10/2000 | Holmes et al. | |
| 6,137,430 A | 10/2000 | Lyden et al. | |
| 6,147,430 A | 11/2000 | Kusase et al. | |
| 6,147,432 A | 11/2000 | Kusase et al. | |
| 6,166,461 A | 12/2000 | Kusase et al. | |
| 6,177,747 B1 | 1/2001 | Maeda et al. | |
| 6,181,043 B1 | 1/2001 | Kusase et al. | |
| 6,181,045 B1 | 1/2001 | Umeda et al. | |
| 6,201,332 B1 | 3/2001 | Umeda et al. | |
| 6,204,586 B1 | 3/2001 | Umeda et al. | |
| 6,208,060 B1 | 3/2001 | Kusase et al. | |
| 6,211,594 B1 | 4/2001 | Umeda et al. | |
| 6,222,295 B1 | 4/2001 | Umeda et al. | |
| 6,242,835 B1 | 6/2001 | Uemura et al. | |
| 6,242,836 B1 | 6/2001 | Ishida et al. | |
| 6,252,326 B1 | 6/2001 | Umeda et al. | |
| 6,268,678 B1 | 7/2001 | Asao et al. | |
| 6,281,614 B1 | 8/2001 | Hill | |
| 6,285,105 B1 | 9/2001 | Asao et al. | |
| 6,291,918 B1 | 9/2001 | Umeda et al. | |
| 6,333,573 B1 | 12/2001 | Nakamura | |
| 6,335,583 B1 | 1/2002 | Kusase et al. | |
| 6,337,530 B1 | 1/2002 | Nakamura et al. | |
| 6,348,750 B1 | 2/2002 | Taji et al. | |
| 6,373,164 B1 | 4/2002 | Nishimura | |
| 6,407,476 B1 | 6/2002 | Nishimura | |
| 6,484,388 B1 | 11/2002 | Amlec et al. | |
| 6,501,204 B1 | 12/2002 | Oohashi et al. | |
| 6,501,205 B1 | 12/2002 | Asao et al. | |
| 6,504,283 B1 | 1/2003 | Asao et al. | |
| 6,552,463 B2 | 4/2003 | Oohashi et al. | |
| 6,570,289 B1 | 5/2003 | Liang et al. | |
| 6,573,622 B2 | 6/2003 | Lim et al. | |
| 6,664,703 B2 | 12/2003 | Oketani et al. | |
| 6,742,238 B2 | 6/2004 | Lee | |
| 6,750,582 B1 * | 6/2004 | Neet | 310/208 |
| 2001/0011852 A1 | 8/2001 | Nakamura et al. | |
| 2001/0019234 A1 | 9/2001 | Murakami et al. | |
| 2001/0020807 A1 | 9/2001 | Imori et al. | |
| 2001/0024071 A1 | 9/2001 | Yoshida et al. | |
| 2001/0026109 A1 | 10/2001 | Higashino et al. | |
| 2001/0030487 A1 | 10/2001 | Higashino et al. | |
| 2001/0040415 A1 | 11/2001 | Asao et al. | |
| 2001/0040416 A1 | 11/2001 | Nakamura et al. | |
| 2001/0040418 A1 | 11/2001 | Higashino et al. | |
| 2002/0033646 A1 | 3/2002 | Tanaka et al. | |
| 2002/0125784 A1 | 9/2002 | Bramson et al. | |
| 2003/0048032 A1 | 3/2003 | Brown et al. | |
| 2003/0132680 A1 | 7/2003 | Nakamura et al. | |
| 2003/0137204 A1 | 7/2003 | Neet | |
| 2003/0137205 A1 | 7/2003 | Neet | |
| 2003/0137207 A1 | 7/2003 | Tamura et al. | |
| 2003/0173860 A1 | 9/2003 | Even | |
| 2003/0193253 A1 | 10/2003 | Arimitsu et al. | |
| 2004/0145267 A1 | 7/2004 | Lowry et al. | |

FOREIGN PATENT DOCUMENTS

| | | |
|---|---|---|
| EP | 1 109 289 | 4/2002 |
| JP | 55 120114 | 9/1980 |
| JP | 56 83911 | 7/1981 |
| JP | 57206244 | 12/1982 |
| JP | 58 192447 | 11/1983 |
| JP | 61189155 | 8/1986 |
| JP | 03107342 | 5/1991 |
| JP | 11178264 | 7/1999 |

* cited by examiner

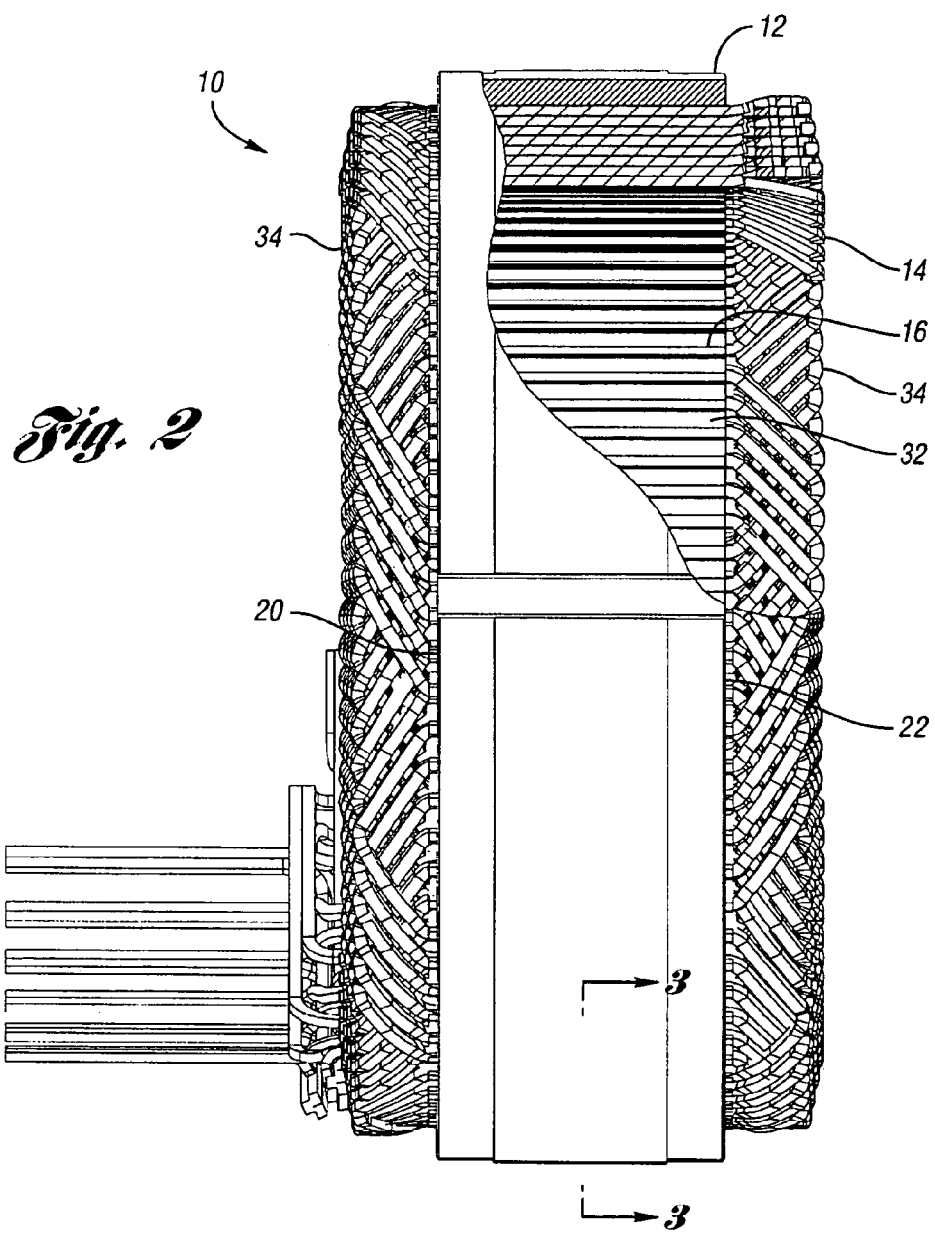
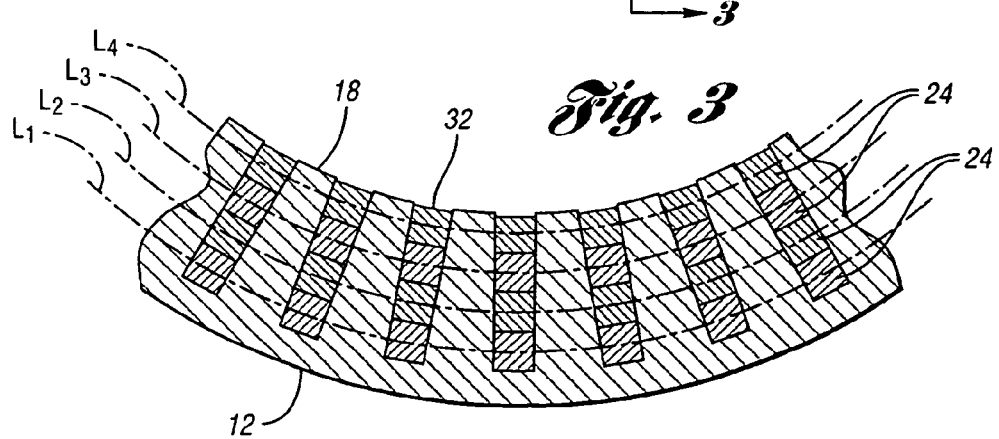

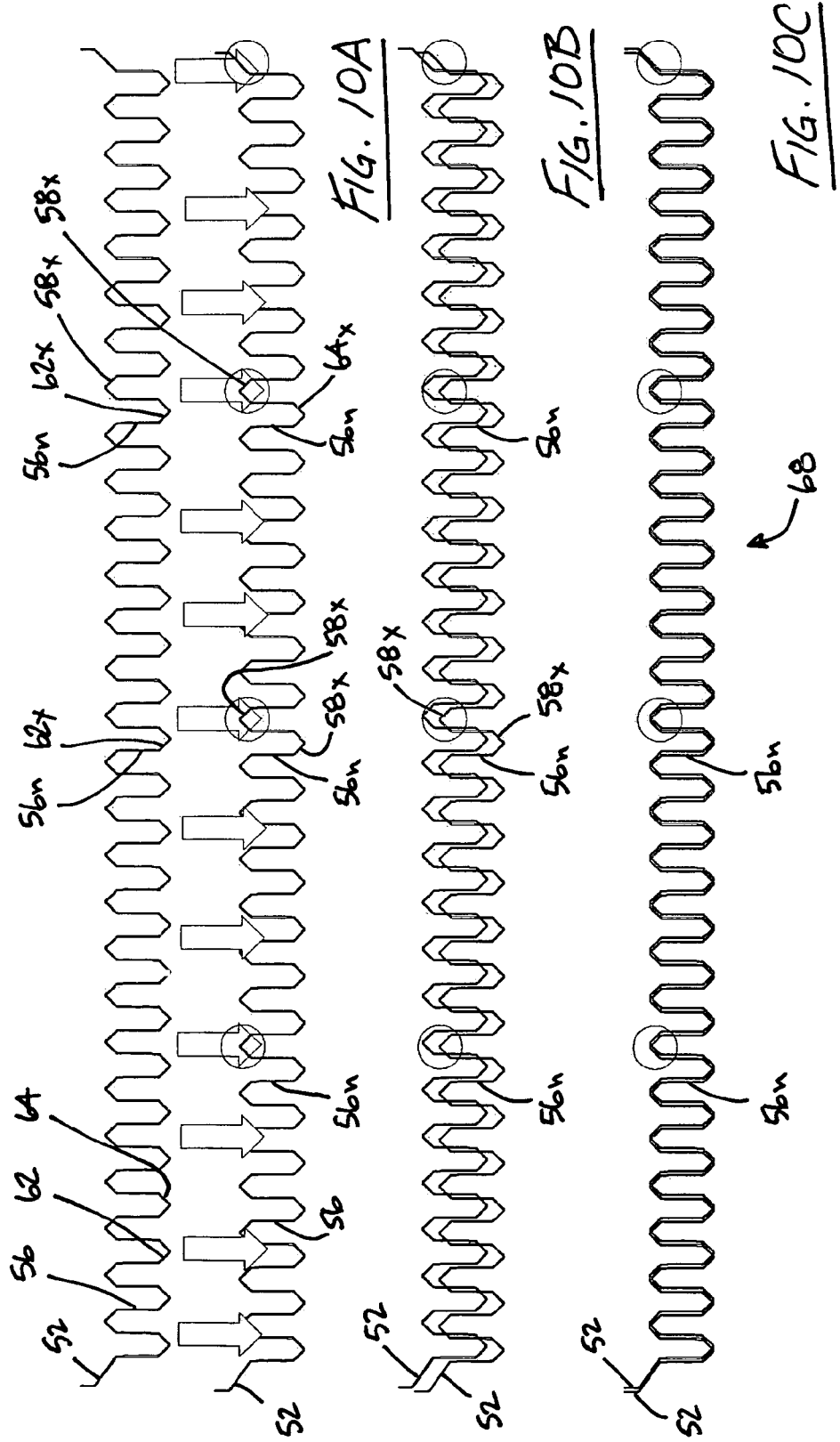

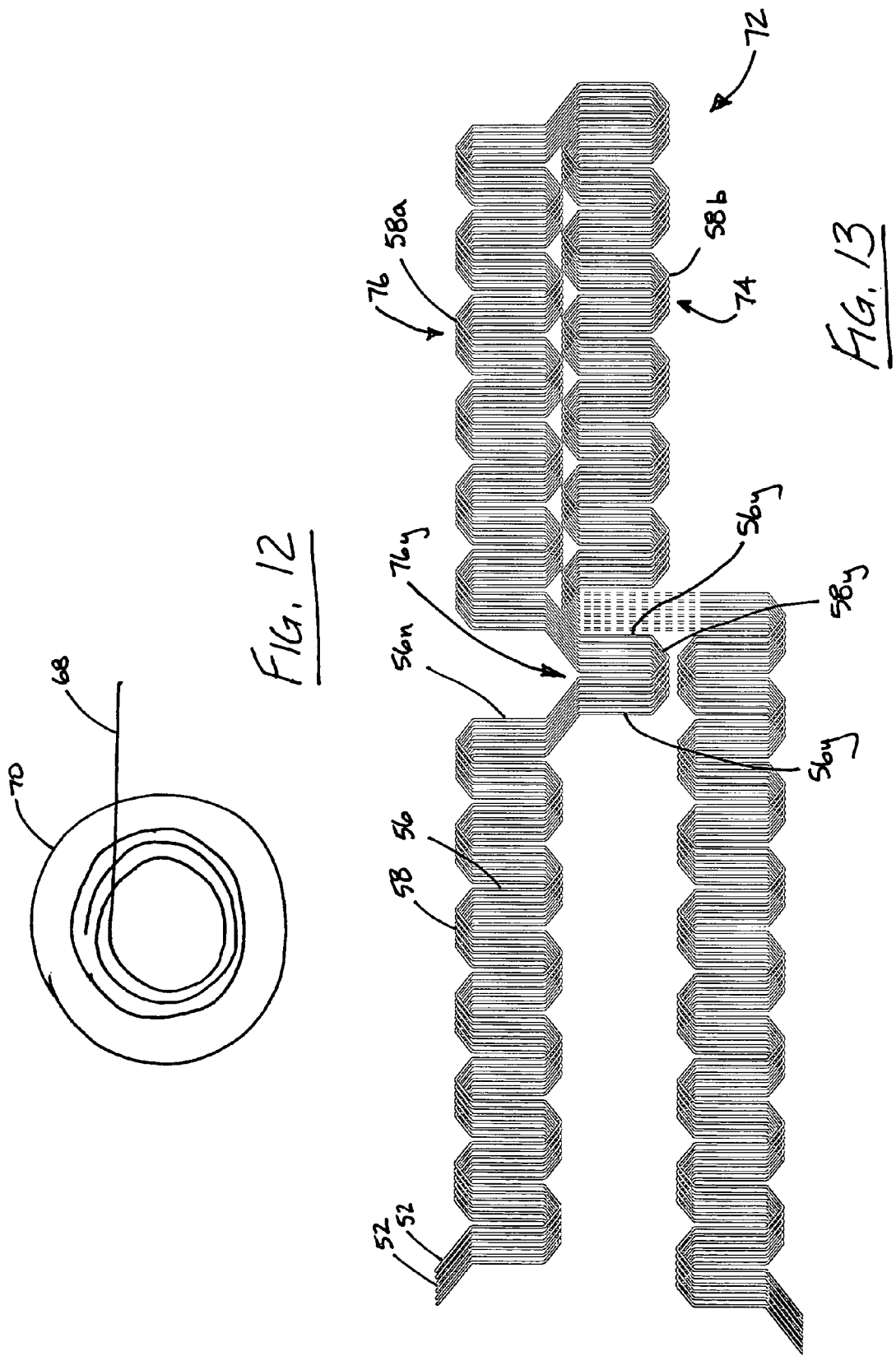

METHOD OF MAKING CASCADED MULTILAYER STATOR WINDING WITH INTERLEAVED TRANSITIONS

FIELD OF THE INVENTION

The invention relates to cascaded stator winding configurations for dynamoelectric machines, such as an automotive electrical alternator, and methods for making such stator winding configurations using a plurality of continuous conductors.

BACKGROUND OF THE INVENTION

Electrical alternators adapted for use in motor vehicle applications typically include a rotor assembly rotatable within an annular stator. Rotor pole pieces, which may preferably be of an interleaved "claw pole" design, rotate with the rotor shaft, while the stator itself includes a stator core defining radially-extending slots in which a plurality of stator windings are disposed. An excitation winding is carried within the cavity formed between pole pieces of the rotor, and a DC signal is applied to the excitation winding through a pair of slip rings and associated brushes. The magnetic field produced by the winding interacts with the pole pieces to create an alternating polarity magnetic field which, upon rotation of the rotor assembly as driven by the vehicle's engine, induces current flow in the stator windings in a known manner.

Because the resistance of the conductors of the stator windings is inversely proportional to alternator output and efficiency, cooling of the stator winding is an important factor for improving alternator output and efficiency. To achieve higher electrical outputs while reducing the overall size of the stator, the prior art has, therefore, sought to employ stator conductors of square or rectangular cross-section to enhance conductor surface area and, hence, enhance convective cooling of the stator windings. Such wire can be laced into the stator core winding slots in a very densely packed configuration, thereby improving "slot space utilization." However, square- or rectangular-cross-section wire is more difficult to form and wind into the stator winding slots, since it is necessary to align the conductor cross-section with the slot.

Designers of stator assemblies further attempt to reduce or eliminate the need for providing electrical conductor terminations and connections in the stator assembly, as a need to physically connect conductors in the stator core assembly adversely impacts cost and complexity of the manufacturing process. To this end, stator windings utilizing continuous conductors with which to form each phase have emerged, including those having a square or rectangular cross-section for use in high-slot-fill, multi-phase stator winding configurations. Each such continuous conductor includes a series of straight segments, disposed in respective slots of the stator core, which are interconnected by end loop segments that project axially from either end of the core. The end loop segments are readily formed of first and second legs that extend first radially-outwardly and then radially-inwardly, respectively, to thereby permit successive straight segments to reside in a common layer, thereby providing a desired cascaded winding configuration.

Such windings typically feature an interleaved radial transition of each conductor between layers, i.e., at the end of a complete revolution, the conductors of the different phases trade radial positions within the stator winding with respect to each other. Such transitions present significant manufacturing challenges and costs, for example, often requiring a simultaneous insertion of the winding's several conductors into the stator core. Further, the resulting transitional (interleaved) end loop segments, which extend either radially-inwardly and/or radially-outwardly of the end loops segments interconnecting the straight segments of the cascaded layer, with such interleaved end loop transitions either protruding more than one conductor width into the internal diameter of the stator core, or extending radially outwardly of a given stator core slot more than one conductor width, thereby undesirably increasing stator package size.

Accordingly, what is needed is a method for making a stator assembly for a dynamoelectric machine, and preferably a method of prefabricating a stator winding preform for insertion into to a stator core to obtain such a stator assembly, featuring a cascaded winding whose interleaved conductor transitions do not position any conductor more than one conductor width radially-outwardly of the radially-outermost conductor layer.

BRIEF SUMMARY OF THE INVENTION

According to an aspect of the invention, a method of making a cascaded multilayer conductor preform for insertion into a number of slots defined in a periphery of a stator core includes forming several continuous conductors to define a number N of generally-parallel, generally-coplanar straight segments interconnected by end loop segments, wherein the first plurality of straight segments are adapted to be received in the slots of the stator core to define a number of winding layers such that the number N of the straight segments defined on each conductor is an integer multiple of the number n of straight segments of each conductor adapted to form each winding layer, wherein each end loop segment includes a first leg and a second leg joined to the first leg at an apex, and wherein a first type of end loop segment is characterized in that the first leg is substantially coplanar with the first plurality of straight segments and at least a portion of the second leg is not substantially coplanar with the first plurality of straight segments. By way of example only, forming includes bending each end loop segment proximate to the apex, as by winding each conductor on a peg board and then pressing the wound conductor to thereby define the desired "jogs."

The method further includes interpositioning the conductors such that the generally-coplanar straight segments are placed in a staggered relation, with the first leg of each first type of end loop segment of a given conductor other than a first conductor overlying a portion of the second leg of each first type of end loop segment of another one of the conductors, and with the first leg of each of at least two end loop segments of the given conductor following the "nth" straight segment of the given conductor lying beneath the respective first leg of a respective pair of end loop segments of the first conductor.

In accordance with an aspect of the invention, interpositioning includes moving the given conductor generally in the direction of extension of the several straight segments of the first conductor. Alternatively, forming includes defining a second end loop segment on each conductor following the "nth" straight segment of the conductor such that the second end loop segment is rotated out of line by a predetermined angle, and interpositioning includes rotating the second end loop segment on each conductor back into line after the conductors are interpositioned in a stagger relation.

In accordance with another aspect of the invention, the forming step advantageously includes defining a plurality of reversing conductor loops rotated out of line with a plurality of forward conductor loops, the reversing conductor loops being rotated out of alignment with the forward conductor loops, and wherein interpositioning includes rotating the reversing conductor loops back into line before rotating the second end loop segment back into line. In this event, the forming step preferably includes defining a second type of end loop segment characterized in that the second leg is substantially coplanar with the first plurality of straight segments and at least a portion of the first leg is not substantially coplanar with the first plurality of straight segments.

Additional features, benefits, and advantages of the invention will become apparent to those skilled in the art to which the invention relates from the subsequent description of several exemplary embodiments and the appended claims, taken in conjunction with the accompanying Drawings.

BRIEF DESCRIPTION OF THE DRAWINGS

In the Drawings, wherein like reference numerals are used to designate like components in each of the several views, and wherein the relative thickness of certain components has been increased for clarity of illustration:

FIG. 2 is a longitudinal section, partially broken away, of the stator core of FIG. 1;

FIG. 3 is another sectional view of the stator core, taken along line 3-3 of FIG. 2, but showing only four single-conductor layers, without insulation, for clarity of illustration;

FIGS. 10A, 10B, and 10C illustrate a first way of interpositioning the several conductors in accordance with the invention to arrive at a winding preform;

FIG. 12 is a diagrammatic illustration of an inserting step wherein the linear winding preform is being inserted over multiple revolutions into the slots of a stator core; and FIG. 13 illustrates an alternative interpositioning step, wherein the second end loop segment following the first conductor's "nth" straight segment, and multiples thereof, and the corresponding end loop segment(s) of subsequently-stacked staggered conductors, are formed so as to be rotated "out of line" by a predetermined angle, such as 180 degrees out of line, to thereafter be rotated back "into line" with the remaining straight segments wind to obtain the desired winding preform.

DETAILED DESCRIPTION OF THE PREFERRED EMBODIMENT

Figure 1:
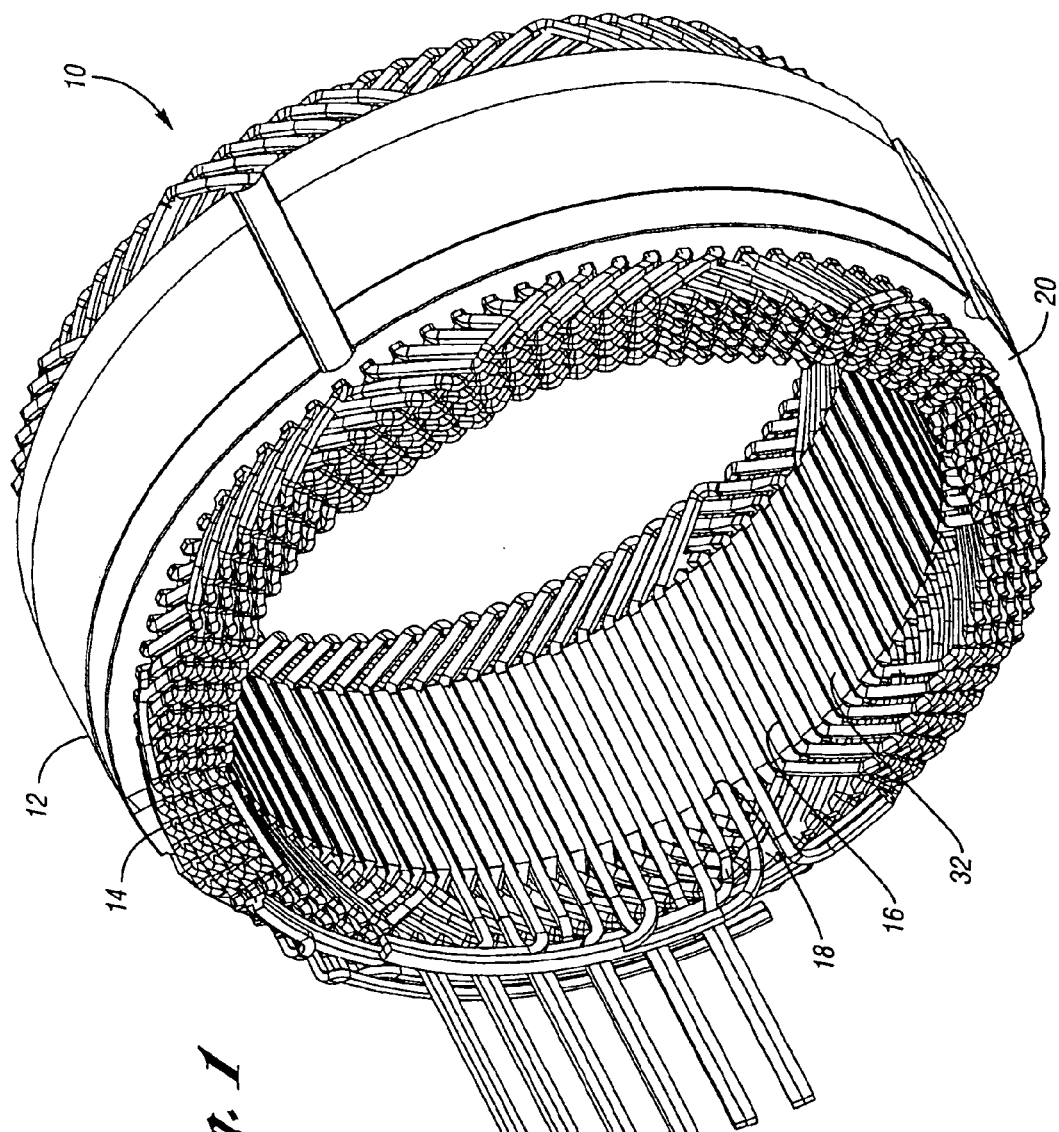
FIG. 1 is a perspective view of an exemplary stator constructed in accordance with the invention.

Referring to FIGS. 1-3, an exemplary twelve-conductor, six-phase, eight-layer stator 10 for a dynamoelectric machine, such as an alternator for a motor vehicle (not shown), includes a generally cylindrical stator core 12 and a stator winding 14 disposed in stator slots 16 defined about the inner periphery 18 of the stator core 12. The slots 16 are equidistantly and circumferentially spaced around the core's inner periphery 18, and extend axially through the stator core 12 from one axial end 20 of the core 12 to the other axial end 22 of the core 12.

The stator winding 14 is generally comprised of a plurality of conductors 24 wound around the stator core 12 within the stator slots 16 to thereby define several concentric conductor winding layers L. As seen in FIG. 3 (in which only four separate single-conductor winding layers L are illustrated for clarity), in order to achieve a high slot fill, the conductor 24 may be of square or rectangular shape when viewed in cross-section, with the width of the conductor 24 including any insulation being closely matched to the width of the core slots 16, including any insulation (again, not shown in FIG. 3 for clarity of illustration). For those skilled in the art, it is known that typical rectangular or square shaped conductors 24 may include radii on the corners intermediate two adjacent edges. It is further noted that the conductor's square or rectangular cross-sectional shape advantageously increases the surface area of the conductors 24 and, therefore, also increases the convective cooling as air passes through the stator core 12 during operation.

Figure 4:
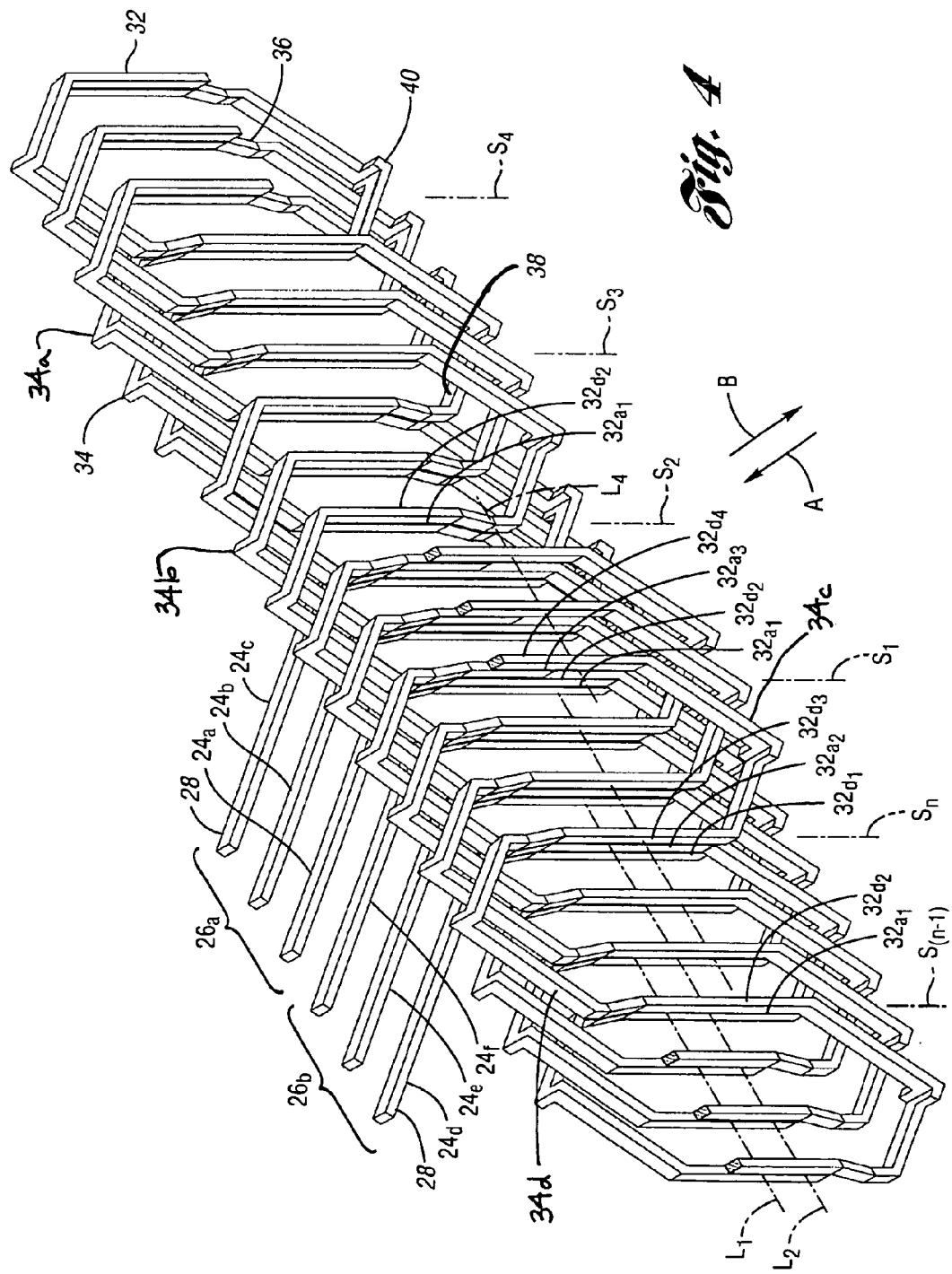
FIG. 4 is a partial view in perspective, partially broken away, of a flattened six-conductor, three-phase, four-layer stator winding in accordance with the invention.
Figure 5:
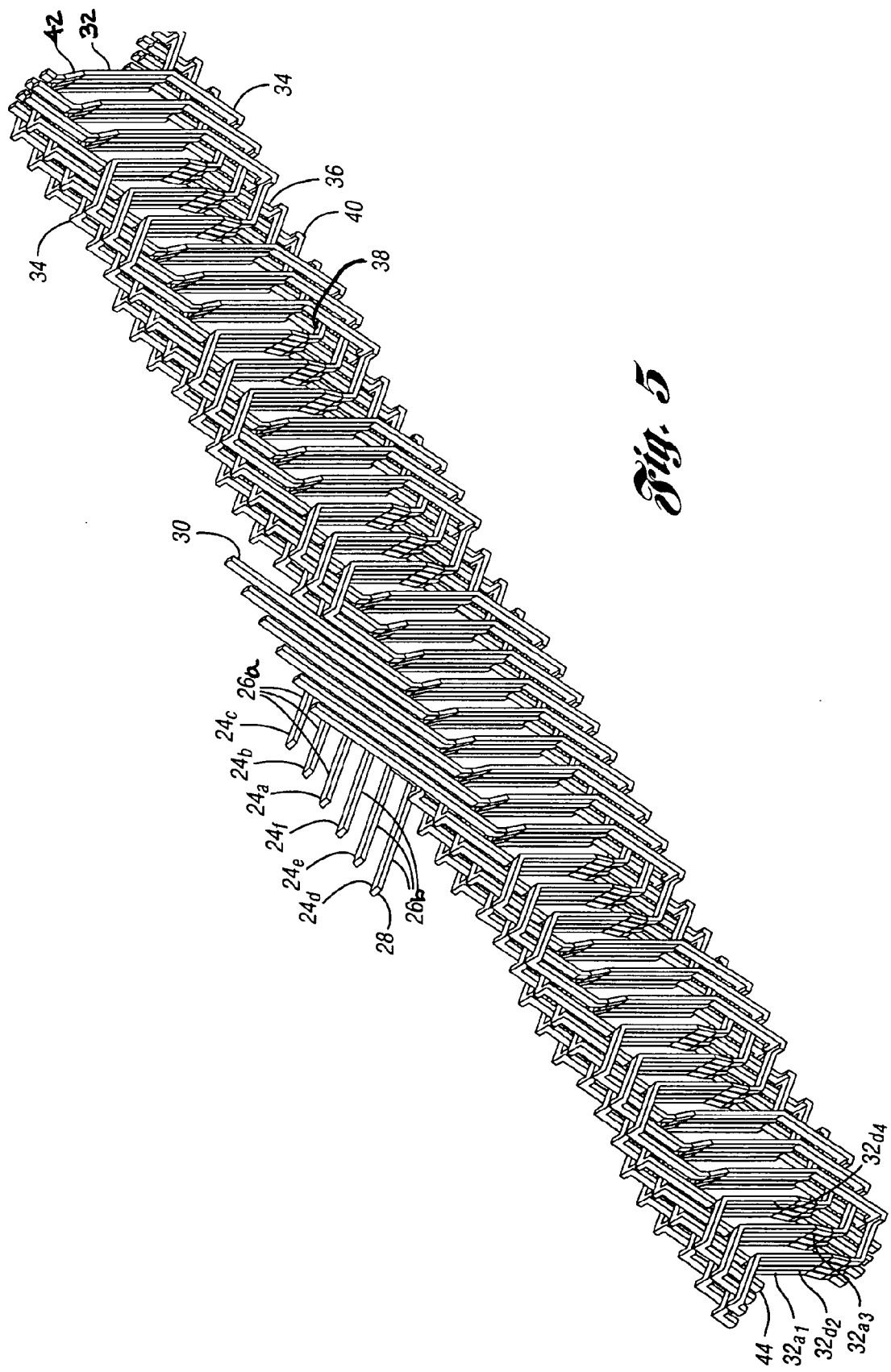
FIG. 5 is a perspective view of a complete stator winding, similar to that of FIG. 4, that has been cut at one point on the winding's circumference and flattened to better illustrate the winding's several winding layers.

As seen in the partial perspective view of a "cut" and "flattened" stator winding 14 shown in FIG. 4, and in the complete "cut" and "flattened" view of FIG. 5, both of which show a six-conductor, three-phase winding 14 for improved clarity of illustration, the stator winding 14 includes six continuous conductors 24 which are divided into a first set 26a of three conductors 24a, 24b, 24c and a second set 26b of three conductors 24d, 24e, 24f. Although sets of three conductors are shown, it is obvious to those skilled in the art that sets with any number of conductors could be utilized, such as six which is commonly used in electrical machines. Each conductor 24 includes a pair of leads 28, 30 (as best seen in FIG. 5) with which the conductors 24 are electrically interconnected to thereby define a desired number of phases in a desired ring or star configuration. Furthermore, the conductors 24 can be electrically interconnected to thereby define a desired number of phases in a plurality of ring or star configurations, such as a dual wye configuration. Each conductor 24 includes a series of slot segments 32 that are disposed within the slots 16 of the stator core 12 (for reference, the first n slots 16 into which the slot segments 32 of the first conductor 24a are inserted are designated in FIG. 4 as $S_1$ through $S_n$).

The slot segments 32 of each conductor 24 are themselves interconnected with end loop segments 34 that extend axially outwardly from the stator core 12 proximate to each stator core face 20, 22, as seen in FIG. 1. Returning to FIG. 4, each end loop segment 34 includes a first leg 36 and a second leg 38 which together define an apex 40 of the end loop segment 34.

Figure 6:
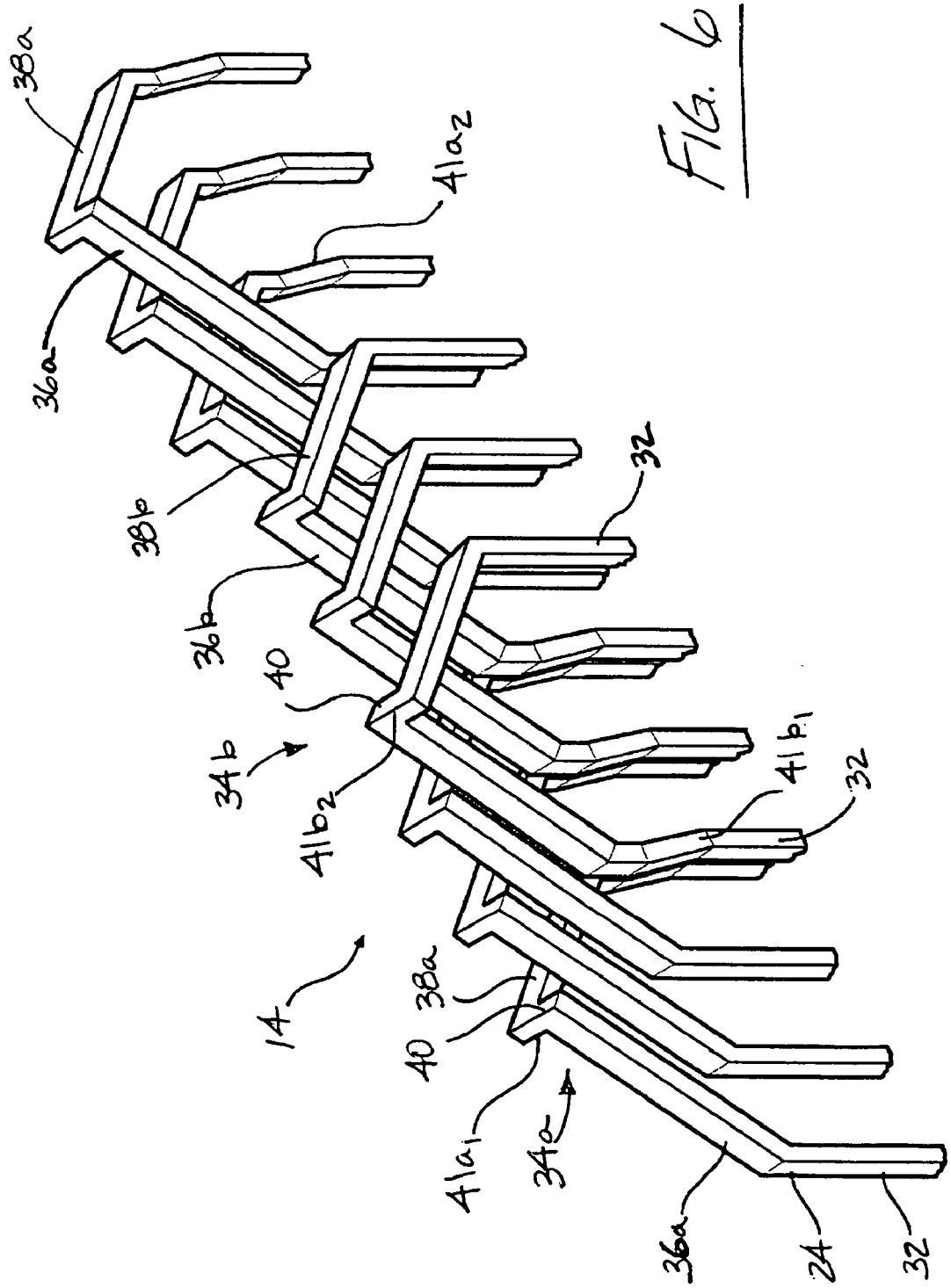
FIG. 6 is an enlarged partial view of the first two radially-outermost winding layers of the stator winding of FIG. 4, illustrating the two types of end loop segments employed in the winding between cascaded slot segments of a given conductor.

As best seen in FIG. 6, the winding 14 includes two types of end loop segments 34a, 34b interconnecting the given pairs of consecutive slot segments 32. In the first type of end loop segment 34a, the first leg 36a remains substantially co-radial with the first slot segment 32, i.e., remains substantially within the same layer L as the first slot segment 32, until the end loop segment's apex 40, whereupon a first radial extension $41a_1$ shifts the conductor 24 radially outwardly (in the direction of Arrow A in FIG. 4) roughly the radial dimension of the conductor 24. The second leg 38a remains substantially radially-outwardly shifted as it approaches the second consecutive slot segment 32, whereupon a second radial extension $41a_2$ shifts the conductor 24 radially inwardly (in the direction of Arrow B in FIG. 4), such that the second slot segment 32 is co-radial with the first.

Referring again to FIG. 6, in the second type of end loop segment 34b, the first leg 36b includes a first radial extension $41b_1$ proximate to the first slot segment 32 that shifts the conductor 24 radially outwardly (in the direction of Arrow A in FIG. 4) roughly the radial dimension of the conductor 24. The first leg 36b remains radially outwardly of the first slot segment's layer L until the end loop segment's apex 40, whereupon a second radial extension $41b_2$ shifts the conductor 24 radially inwardly (in the direction of Arrow B in FIG. 4) to a point co-radial with the first slot segment 32. The second leg 38b of the second type of end loop segment 34b remains substantially co-radial with the first slot segment 32 until it reaches the second slot segment 32 (which is also co-radial with the first slot segment 32).

In this manner, several consecutive slot segments 32 of a given conductor 24 reside in the same winding layer L of the stator winding 14 for nearly a complete revolution around the stator core 12, thereby providing the resulting winding with a substantially cascaded winding pattern, while further advantageously ensuring that the cascaded layers do not extend radially inwardly beyond the innermost layer L of the winding 14. Together, the conductors 24 define a first, radially-outermost winding layer $L_1$, and three successively adjacent, cascaded radially-inward winding layers $L_2$, $L_3$, $L_4$ (best seen in FIG. 3).

Figure 7:
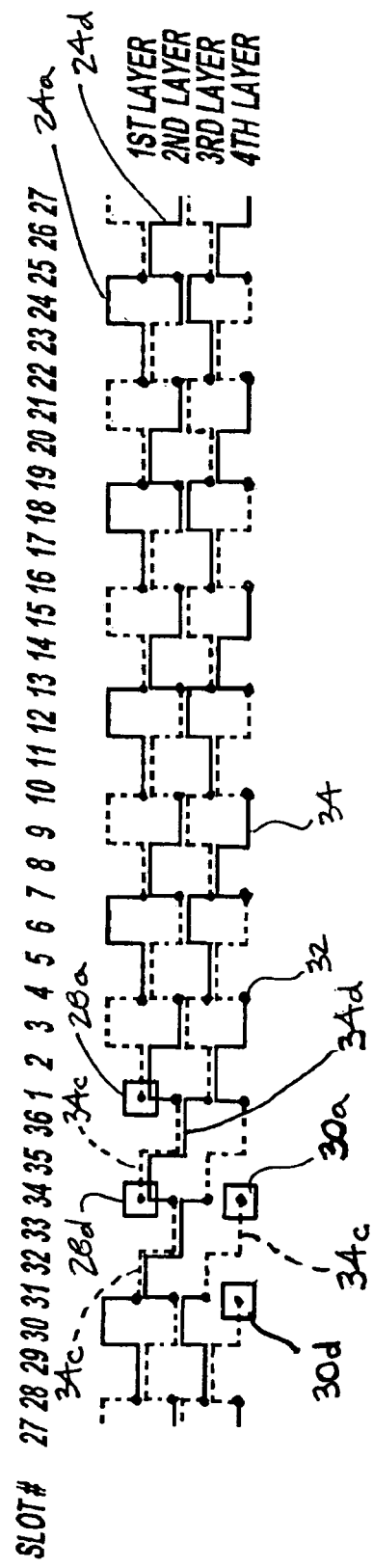
FIG. 7 is a schematic view illustrating two conductors defining one phase of the stator winding of FIG. 4, prior to insertion into the core.

FIG. 7 is a schematic diagram illustrating the transition of the conductors 24 from one layer to the next layer of the three-phase, four-layer winding pattern of FIGS. 4 and 5, as viewed from what will become the first axial end 20 of the inserted winding 14. For clarity, only the two conductors 24 forming one phase of the three-phase stator winding 14 is illustrated prior to insertion into the stator core 12, with the core slot position in which the respective slot segments 32 are disposed after insertion of the winding 14 into selected ones of the thirty-six slots 16 defined in the stator core 12.

As seen in FIG. 7, in which the end loop segments 34 defining the first stator assembly's first axial end 20 are shown in solid lines, and the end loop segments 34 on the assembly's second axial end 22 are shown in broken lines, the respective first leads 28 of the first and fourth conductors 24a, 24d, as identified in the preceding Figures, are received in the first slot $S_1$ and the thirty-fourth slot $S_{34}$. From the first slot $S_1$ through the thirty-first slot $S_{31}$, a respective first plurality of consecutive slot segments 32 of the first and fourth conductors 24a, 24d define the radially-outermost first layer $L_1$ and radially-inwardly-adjacent second layer $L_2$, wherein each end loop segment 34a, 34b includes an equal number of radially-outward and radially-inward extensions to thereby maintain each of the consecutive slot segments 32 within the conductor's respective winding layer L.

Between the thirty-first slot $S_{31}$ and the first slot $S_1$, the two conductors 24a, 24d, two types of transition area end loop segments 34c, 34d interconnect slot segments 32 that are disposed in different layers L of the winding 14 and, hence, are characterized by an unequal number of radially-outward and radially-inward extensions. By way of example, the fourth conductor 24 is disposed in the first layer $L_1$ at the thirty-fourth slot $S_{34}$, whereupon the adjacent transition area end loop segment 34c (when moving left to right in FIG. 7) will be seen to include only a single radially-inward extension to thereby locate the immediately-following slot segment 32 in the second layer $L_2$ at the first slot $S_1$. By way of further example, after the first conductor 24a has traversed the stator core 12 in the first layer $L_1$ to reach the thirty-first slot $S_{31}$, the immediately adjacent transition area end loop segment 34c includes only a single radially-inward extension to thereby locate the immediately-following slot segment 32 in the second layer $L_2$ at the thirty-fourth slot $S_{34}$. The first conductor's immediately subsequent transition area end loop segment 34d includes three radial extensions, specifically, two radially-inward extensions and one radially-outward extension, whereby the immediately following slot segment 32 of the first conductor 24a is disposed in the third layer $L_3$ at the first slot $S_1$.

Referring again to FIG. 4, and describing the winding the first and fourth conductors 24a, 24d of a particular phase for clarity of illustration, a first plurality of consecutive slot segments $32a_1$, of the first conductor 24a are disposed in the slots 16 of the stator core 12 to define nearly a complete revolution of the first winding layer $L_1$, beginning at core slot $S_1$. Before the first conductor 24a can be inserted into the last core slot $S_n$ of the first winding layer $L_1$, the fourth conductor 24d is disposed in the last core slot $S_n$ to thereby define a portion of the first winding layer $L_1$ with a single slot segment $32d_1$ immediately adjacent to its starting lead 28d.

With the single slot segment $32d_1$, occupying the last core slot $S_n$ to thereby define a portion of the first winding layer $L_1$, the first conductor 24a is disposed in core slot $S_n$ to thereby define the first slot segment $32a_2$ of the second winding layer $L_2$. A first plurality of consecutive slot segments $32d_2$ of the fourth conductor 24d are disposed in core slots $S_1$ through $S_{n-1}$ to thereby define nearly a complete revolution of the second winding layer $L_2$, while a second plurality of consecutive slot segments $32a_3$ of the first conductor 24a are disposed radially inward of these fourth conductor slot segments $32d_2$ into core slots $S_1$ through $S_{n-1}$ to thereby define nearly a complete revolution of the third winding layer $L_3$.

The fourth conductor 24d is disposed in core slot $S_{n-1}$ to thereby complete the second winding layer $L_2$, a second single slot segment $32d_3$ of the fourth conductor 24d is disposed in core slot $S_n$ to define a portion of the third winding layer $L_3$ in that slot $S_n$, whereupon the fourth conductor 24d is further disposed in the stator core 12 to thereby define nearly all of a fourth winding layer $L_4$ at core slots $S_1$ through $S_{n-1}$ (best seen in FIG. 5). A second single slot segment $32a_4$ (seen in FIG. 5) of the first conductor 24a, is disposed in core slot $S_n$ radially inward of the second single slot segment $32d_3$ of the fourth conductor 24d, completes the fourth winding layer $L_4$.

The other conductors 24b, 24c of the first conductor set 26a are disposed in the core slots 16 in a like manner as the first conductor 24a, but for their relative circumferential positions about the stator core 12. Similarly, the other conductors 24e, 24f of the second conductor set 26b are disposed in the core slots 16 in a like manner as the fourth conductor 24d, but for their relative circumferential positions about the stator core 12. In this manner, the slot segments 32 of the conductors 24 of all of the phases in the radially-outermost slot position define the first winding layer $L_1$, whereupon the slot segments 32 of the conductors 24 fill increasingly-radially-inward positions within the stator core's slots 16.

Also as best seen in FIG. 4, the end loop segments 34a, 34b of the several conductors 24 overlap to thereby permit consecutive slot segments 32 of each conductor 24 to traverse the stator core 12 within a given winding layer L. Specifically, the legs 36,38 of the conductor's end loop segments 34 permit several conductors 24 to be positioned in a cascaded structure having a suitable number of phases. By way of example only, the exemplary stator 10 has three phases, respectively defined by the first and fourth conductors 24a, 24d, the second and fifth conductors 24b, 24e, and the third and sixth conductors 24c, 24f. Although only three phases have been shown, those skilled in the art will realize any number of phases could be utilized, such as six.

Thus, when the first set 26a of conductors 24a, 24b, 24c have made nearly one complete revolution around the stator core 12, the respective transition area end loop segments 34c on the axial end 22 connecting each conductor's next-to-last slot segment 32 (such as the slot segment $32a_1$ disposed in slot $S_{n-1}$) from the last slot segment 32 (such as the slot segment $32a_2$ disposed in slot $S_n$) defines a radial extension that shifts the respective conductor 24a, 24b, 24c radially inwardly, such that the conductor's last slot segment 32 is positioned in the next, immediately-radially-inward winding layer $L_2$. Similarly, the transition area end loop segments 34d on the axial end 20 connecting each conductor's last slot segment 32 in a given layer L (such as $32a_2$ disposed in slot $S_n$) from the following slot segment 32 in a different layer L (such as $32a_3$ disposed in slot $S_1$) each define a radial extension that shifts the respective conductor 24a, 24b, 24c radially inwardly, such that the following slot segment ($32a_3$) is positioned in the next, immediately-radially-inward winding layer (in this case, the third layer $L_3$).

And, when the first set 26a of conductors 24a, 24b, 24c completes the remainder of the winding layer $L_3$, the transition area end loop segment 34c located on the axial end 22 separating the next-to-last slot segment 32 from the last slot segment 32 of the conductors 24a, 24b, 24c (adjacent to the ending leads 30) defines a radial extension that shifts the respective conductors 24a, 24b, 24c radially inward, such that the conductors last slot segment adjacent the ending leads 30 is positioned in the radially-innermost fourth layer $L_4$.

With respect to the second set 26b of conductors, the first slot segments 32 adjacent the leads 28, such as slot segment $32d_1$ disposed in slot $S_n$, is located in layer $L_1$. The transition area end loop segments 34c located on the second axial end 22 of the core, which connect the first slot segments 32 (disposed in slot $S_n$) with the second slot segments 32 (disposed in slot $S_1$) defines a radial extension that shifts the respective conductors 24d, 24e, 24f radially inward, such that the second slot segments are disposed in the next, immediately-radially-inward layer $L_2$. When the second set 26a of conductors 24d, 24e, 24f have made nearly one complete revolution around the stator core 12 disposed in layer $L_2$, the respective transition area end loop segment 34d on the axial end 20 connecting the last slot segment 32, (such as slot segment $32d_2$ disposed in slot $S_{n-1}$) from the immediately-following slot segment 32 (such as slot segment $32d_3$ disposed in slot $S_n$) of the conductors 24d, 24e, 24f defines a radial extension that shifts the respective conductor 24d, 24e, 24f radially inwardly, such that the conductor's next slot segment 32 is positioned in the next, immediately-radially-inward winding layer $L_3$.

Furthermore, the transition area end loop segment 34c on the second axial end 22 connecting, for example, the fourth conductor's next slot segment $32d_3$ (disposed in slot $S_n$) from the following slot segment $32d_4$ (disposed in slot $S_1$) defines a radial extension that shifts the conductor 24d radially inwardly, such that slot segment $32d_4$ is positioned in the next, immediately-radially-inward winding layer $L_4$. In this manner, transition area end loop segments 34c, 34d that shift a conductor radially inward to thereby interconnect slot segments 32 disposed in different layers include a radial extension in the inward direction by having at least one more inward radial extension or adjustment than the number of outward radial extensions or adjustments.

As seen in FIG. 4, certain transition area end loop segments certain special end loop segments 34c are characterized by one inward radial adjustment and zero outward radial adjustments, while other transition area end loop segments 34d are characterized by two inward radial adjustments and one outward radial adjustment. For a stator having L number of layers, the number of transition area end loop segments 34c, 34d which interconnect two slot segments 32 disposed in different layers is equal to 2L−2 per phase. For a stator having P number of electrical poles, the number of total end loop segments 34 per phase is equal to (P−1)*L. Therefore, a stator having eight Poles and eight layers has fifty-six total number of end loop segments 34 per phase, of which fourteen end loop segments are transition area end loop segments 34c, 34d interconnecting slot segments 32 disposed in different layers L. This results in a winding 14 in which 25% of the end loop segments 34 are transition area end loop segments 34c, 34d.

Furthermore, a stator having ten Poles and four layers has thirty-six total number of end loop segments 34 per phase, of which six end loop segments 34 are transition area end loop segments 34c, 34d connecting slot segments 32 in different layer. This results in a winding 14 in which 16.7% of the end loop segments 34 are transition area end loop segments 34c, 34d. Conversely, for the two mentioned cases, the winding 14 respectively includes 75% and 83.3% of all end loop segments 34 connect two slot segments 32 disposed in the same layer. Consequently, the winding 14 for the two respective cases respectively includes 25% and 16.7% of the end loop segments 34 are transition area end loop segments 34c, 34d, characterized by having one more radial inward adjustment than outward adjustments.

FIG. 5 shows a complete stator winding 14, cut at one point and "flattened" for ease of illustration. Following each conductor 24 from one starting lead 28 towards the first cut end 42 and then again from the second cut end 44 back towards the ending leads 30, the stator winding 24 has a cascaded construction as discussed above, with the first set 26a of conductors 24a, 24b, 24c defining nearly all of the radially-outermost first winding layer $L_1$, an initial portion of the intermediate second winding layer $L_2$, nearly all of the third winding layer $L_3$ and an initial portion of the radially-innermost fourth winding layer $L_4$.

The second set 26b of conductors 24d, 24e, 24f define the remaining portion of the radially-outermost first winding layer $L_1$, nearly all of the second winding layer $L_2$, an initial portion of the third winding layer $L_3$, and nearly all of the radially-innermost fourth winding layer $L_4$. The two conductors, such as 24a and 24d, could be formed of one continuous wire. This can be achieved by an incorporating an auxiliary continuous end loop (not shown) between the two leads 30 of the conductors 24a and 24d. Similarly, the conductors 24b and 24e could be formed from one continuous wire and conductors 24c and 24f could be formed from one continuous wire. Although the two conductors, such as 24a and 24d, are formed from one wire, for simplicity of description, they are still considered as two conductors, such as 24a and 24d.

The preceding discussion has centered around a winding 14 having a single slot segment 32 (such as $32d_1$, of the second conductor 24d) disposed in the first layer $L_1$ of the winding and, therefore, a single slot segment 32 (such as $32a_2$, of the first conductor 24a) disposed in the second layer $L_2$. For space concerns, however, it may be desirable to separate the leads 28 of the conductors 24d, 24e, 24f of the second conductor set 26b from the leads 28 of the conductors 24a, 24b, 24c of the first conductor set 26a. This can be accomplished by disposing the second conductor set 26b shifted over three additional slots such that the slot segment $32d_1$ is disposed in slot $S_{n-1}$.

In this case, the second conductor 24d does not have a single slot segment 32d, disposed in the first layer $L_1$, but rather two slot segments 32 disposed in the first layer $L_1$ adjacent the lead 24d. The first slot segment $32d_1$ is disposed in the first layer $L_1$ of slot $S_{n-1}$ and a second slot segment 32 is disposed in the first layer $L_1$ of slot $S_n$. The other conductors 24e, 24f of the second conductor set 26b are disposed in the core slots 16 in a like manner as the conductor 24d, but for their relative circumferential positions about the stator core 12.

Similarly, the conductor 24a of the first conductor set 26a has a slot segment $32a_2$ disposed in the second layer $L_2$ of slot $S_{n-1}$ and a slot segment 32 disposed in the second layer $L_2$ of slot $S_n$. The other conductors 24b, 24c of the first conductor set 26a are disposed in the core slots 16 in a like manner as the first conductor 24a, but for their relative circumferential positions about the stator core 12. Similarly, further layers, such as $L_3$ and $L_4$, would have two slot segments 32 of each conductor 24a and 24d disposed in a certain layer rather than a single slot segment 32 as previously discussed. Furthermore, the leads 28 of the second conductor set 26b could be further shifted any number of slots 16 resulting in a plurality of slot segments 32 of the second conductor 24d being disposed in the first layer $L_1$ and a plurality of slot segments 32 of the first conductor 24a being disposed in the second layer $L_2$.

Figure 8:
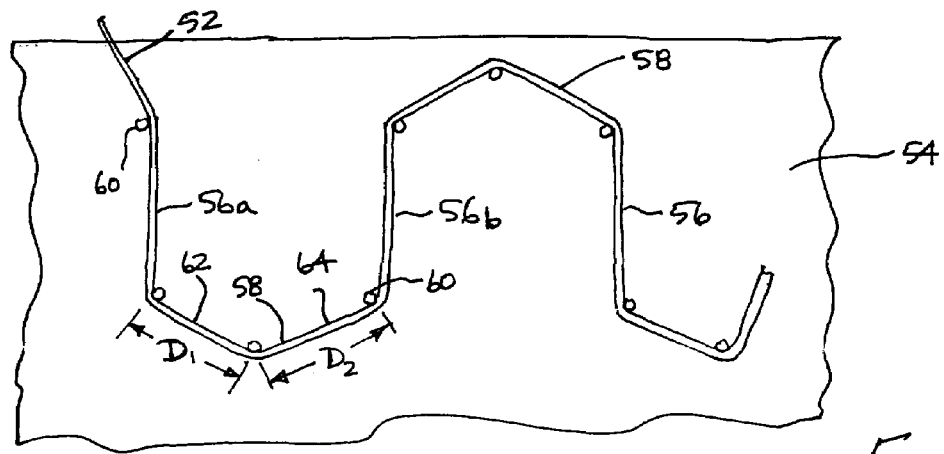
FIGS. 8 and 9 illustrate the first steps in an exemplary method of making a multilayer cascaded stator winding, in accordance with the invention, wherein each of several continuous conductors are formed as by winding and pressing to thereby define a plurality of straight conductor segments interconnected by end loop segments.
Figure 9:
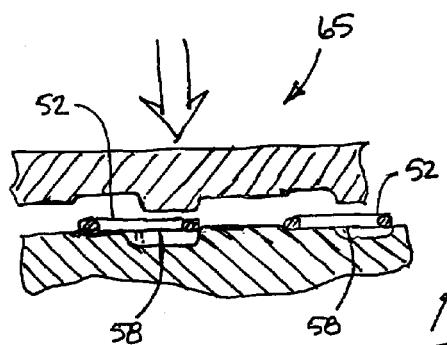

Referring to FIG. 8, a first exemplary method for making a multilayer winding preform for insertion into the several radial slots 16 of the stator core 12, begins by forming each of several continuous conductors 52 by winding each conductor 52 individually on a peg board 54 to define generally-coplanar generally-parallel-spaced straight conductor segments 56 interconnected by end loop segments 58. The pegs 60 are preferably positioned on the peg board 54 so as to anticipate changes in the length of each leg 62, 64 of each end loop segment 56 during subsequent formation of one or more generally-orthogonal "jogs" or "kicks" in one or both of the legs, as during a generally-orthogonal pressing step 65 as illustrated diagrammatically in FIG. 9.

By way of example only, the first leg 62 of the conductor 52 illustrated conductor end loop segments 58 will be pressed to form a first type of end loop segment 58, wherein the first leg 62 remains generally coplanar with the adjacent (leading) straight segment 56a, and wherein the second leg 64 "jogs" twice, the first time proximate to the end loop segment's apex 66 and the second time proximate the adjacent (trailing) straight segment 56b. With each "jog" being roughly equal to the nominal radial dimension of the conductor 52, and for a nominal post-forming geometry characterized by generally-equal-length legs 62, 64, it will be appreciated that the peg spacing $D_1$ with which to form the end loop segment's second leg 64 is preferably greater than the peg spacing $D_2$ with which to form the end loop segment's first leg by an amount roughly twice the conductor radial dimension. It will be appreciated that the peg spacing $D_1$, $D_2$ is preferably adjusted to thereby provide the first legs 62 of all conductor end loop segments 58 with a substantially similar formed length and, similarly, provide the second legs 64 of all conductor end loop segments 58 with a substantially similar formed length (that may be the same or different from the nominal formed length of the end loop segments' first legs 62), in order to achieve maximum winding compactness.

Figure 11:
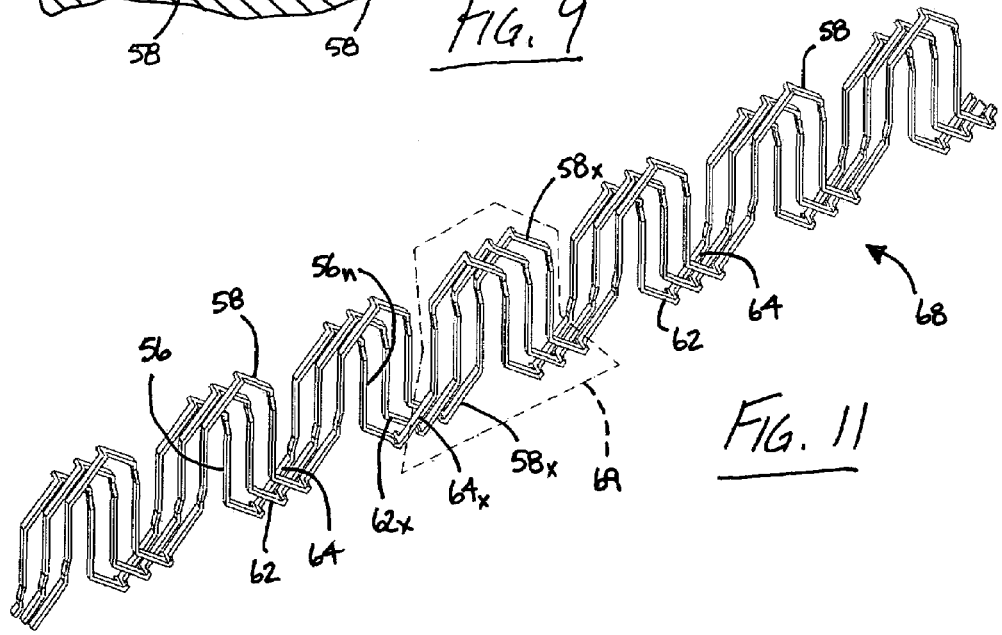
FIG. 11 is a partial view of the resulting winding preform, subsequent to the interpositioning step of FIG. 10C.

Referring to FIGS. 10A, 10B, and 10C, the thus-formed conductors 52 are interpositioned to obtain a winding preform 68, a portion of which is also illustrated in FIG. 11. Specifically, the second and each subsequent conductor 52 is moved generally in the direction of extension of the several straight segments 56 of the first conductor 52, such that the respective straight segments 56 of the interpositioned conductors 52 are placed in a staggered relation and, further, with the exception of the two end loop segments 58x following the first conductor's "nth" straight segment 56n, and multiples thereof ("n" being equal to the number of stator core slots divided by the number of conductors 52 that will form a given winding layer), with a first leg 62 of each subsequent conductor's end loop segments 58 generally overlying a second leg 64 of the immediately-prior conductor's end loop segments 58.

As to the two end loop segments 58x following the first conductor's "nth" straight segment 56n, and multiples thereof, the first leg 62x of the end loop segments 58x of the second conductor 52 and subsequently interpositioned conductors 52 is positioned beneath the second leg 64x of the first or immediately-prior conductor's end loop segments 58x. These latter end loop segments 58x thereby serve to define interleaved transition areas (also identified by reference numeral 69 in FIG. 11) when the resulting preform 68 is subsequently inserted into the radial slots of the stator core 70 over multiple revolutions, as illustrated diagrammatically in FIG. 12, to thereby obtain the desired multilayer cascaded stator winding. It will be appreciated that, while the invention contemplates any suitable manner of maintaining the interpositioned conductors 52 in the configuration illustrated in FIG. 11, the preform 68 is advantageously placed in a linear magazine (not shown) for ultimate insertion into the stator core.

FIG. 13 illustrates an alternative interpositioning step 72, wherein the conductors 52 are formed such that the second end loop segment 58y following the first conductor's "nth" straight segment 56n (and multiples thereof, if any), and the corresponding end loop segment(s) 58y of subsequently-stacked staggered conductors 52, are each formed so as to be rotated transversely "out of line" by a predetermined angle, such as 180 degrees out of line (and, hence, back into the common plane of the other straight segments 56). With suitable "jogs" similarly formed, as by pressing after winding on a peg board, the several conductors are sequentially loaded, for example, into a linear magazine such that the straight segments of all but those immediately adjacent to the rotated-out end loop segments are generally-coplanar, generally parallel-spaced, and staggered with respect to one another. With all of the conductors 52 thus positioned, the "rotated-out" end loop segment 58y is transversely rotated back such that the straight segments 56y on either side of the "rotated-out" end loop segment 58y are brought generally "back into line" with the other straight segments 56 of the several conductors 52 (albeit, in opposite stacking order), to thereby obtain the winding preform 68 with interleaved transitions as partially illustrated in FIG. 11. It will be appreciated that, while FIG. 13 shows the "rotated-out" end loop segments 58y to be transversely rotated 180 degrees out of line, it will be appreciated that the invention contemplates any suitable angle by which to permit the described positioning of the several conductors and subsequent "return to line" of the "rotated-out" transition area end loop segments 58y.

In accordance with another feature of the invention, if the formed conductors 52 include "reversing loops 74" thereby interconnecting the first type of end loop segments 58a with the second type of end loop segments 58b, as is also illustrated in FIG. 13 (the reversing loops 74 are wound right-to-left as illustrated in the lower portion of FIG. 13, a portion of which have been shifted downwardly solely for clarity of illustration), the reversing loops 72 are likewise formed so as to be "rotated-out" of alignment with the "forward loops 76" (wound left to right as illustrated in the upper portion of FIG. 13), with the conductors 52 of one of the reversing loops 74y being stacked directly atop of the conductors 52 defining the "rotated-out" forward loop 76y. With the conductors 52 thus formed and loaded into a linear magazine (not shown), the "rotated-out" reversing loops 74 and "rotated-out" forward loop 76y are rotated back "into line" to thereby obtain a winding preform having both types of end loop segments, similar to the partial winding illustrated in FIG. 6.

While the above description constitutes the preferred embodiment, it will be appreciated that the invention is susceptible to modification, variation and change without departing from the proper scope and fair meaning of the subjoined claims. For example, while the invention is disclosed above in connection with an exemplary stator assembly of bifilar construction, it will be appreciated that the invention contemplates other multi-filar or monofilar configurations. And while the disclosed exemplary method of making a winding preform for insertion into a stator core includes forming the conductors by individually pressing each conductor after winding the conductor on a peg board, before the interpositioning step, the invention contemplates forming the desired "jogs" before forming the "loops" as by winding each conductor on the peg board in each conductor. The invention similarly contemplates forming the desired "jogs" after the interpositioning step.

What is claimed is:

1. A method of making a cascaded multilayer conductor preform for insertion into a number of slots defined in a periphery of a stator core, the method comprising:
   forming several continuous conductors to define a number N of generally-parallel, generally-coplanar straight segments interconnected by end loop segments, wherein the first plurality of straight segments are adapted to be received in the slots of the stator core to define a number of winding layers such that the number N of the straight segments defined on each conductor is a nonunitary integer multiple of the number n of straight segments of each conductor adapted to form each winding layer, wherein each end loop segment includes a first leg and a second leg joined to the first leg at an apex, and wherein a first type of end loop segment is characterized in that the first leg is substantially coplanar with the first plurality of straight segments and at least a portion of the second leg is not substantially coplanar with the first plurality of straight segments; and
   interpositioning the conductors such that the generally-coplanar straight segments are placed in a staggered relation, with the first leg of each first type of end loop segment of a given conductor other than a first conductor overlying a portion of the second leg of each first type of end loop segment of another one of the conductors, and with the first leg of each of at least two end loop segments of the given conductor following the "nth" straight segment of the given conductor lying beneath the respective first leg of a respective pair of end loop segments of the first conductor.

2. The method of claim 1, wherein forming includes bending each end loop segment proximate to the apex.

3. The method of claim 1, wherein interpositioning includes moving the given conductor generally in the direction of extension of the several straight segments of the first conductor.

4. The method of claim 1, wherein forming includes defining a second end loop segment on each conductor following the "nth" straight segment of the conductor such that the second end loop segment is rotated out of line by a predetermined angle, and wherein interpositioning includes rotating the second end loop segment on each conductor back into line after the conductors are interpositioned in a stagger relation.

5. The method of claim 4, wherein forming includes defining a plurality of reversing conductor loops rotated out of line with a plurality of forward conductor loops, the reversing conductor loops being rotated out of alignment with the forward conductor loops, and wherein interpositioning includes rotating the reversing conductor loops back into line before rotating the second end loop segment back into line.

6. The method of claim 5, wherein forming reversing conductor loops further defines a second type of end loop segment characterized in that the second leg is substantially coplanar with the first plurality of straight segments and at least a portion of the first leg is not substantially coplanar with the first plurality of straight segments.

7. A method of making a cascaded multilayer stator assembly, the method comprising:
   forming several continuous conductors to define a number N of generally-parallel, generally-coplanar straight segments interconnected by end loop segments, wherein each end loop segment includes a first leg and a second leg joined to the first leg at an apex, and wherein a first type of end loop segment is characterized in that the first leg is substantially coplanar with the first plurality of straight segments and at least a portion of the second leg is not substantially coplanar with the first plurality of straight segments;
   interpositioning the conductors such that the generally-coplanar straight segments are placed in a staggered relation, with the first leg of each first type of end loop segment of a given conductor other than a first conductor overlying a portion of the second leg of each first type of end loop segment of another one of the conductors, and with the first leg of each of at least two end loop segments of the given conductor following the "nth" straight segment of the given conductor lying beneath the respective first leg of a respective pair of end loop segments of the first conductor, whereby a length of a winding preform is obtained; and inserting the first plurality of straight segments of the winding preform into a number of slots defined in a periphery of a stator core to define a number of winding layers such that the number N of the straight segments defined on each conductor is a nonunitary integer multiple of the number n of straight segments of each conductor adapted to form each winding layer.

8. The method of claim 7, wherein interpositioning includes moving the given conductor generally in the direction of extension of the several straight segments of the first conductor.

9. The method of claim 7, wherein forming includes defining a second end loop segment on each conductor following the "nth" straight segment of the conductor such that the second end loop segment is rotated out of line by a predetermined angle, and wherein interpositioning includes rotating the second end loop segment on each conductor back into line after the conductors are interpositioned in a stagger relation.

10. The method of claim 9, wherein forming includes defining a plurality of reversing conductor loops rotated out of line with a plurality of forward conductor loops, the reversing conductor loops being rotated out of alignment with the forward conductor loops, and wherein interpositioning includes rotating the reversing conductor loops back into line before rotating the second end loop segment back into line.

11. The method of claim 10, wherein forming reversing conductor loops further defines a second type of end loop segment characterized in that the second leg is substantially coplanar with the first plurality of straight segments and at least a portion of the first leg is not substantially coplanar with the first plurality of straight segments.

* * * * *